Feb. 21, 1950 P. H. NUMSEN ET AL 2,498,341
FISH GATE
Filed Feb. 10, 1947 2 Sheets-Sheet 2
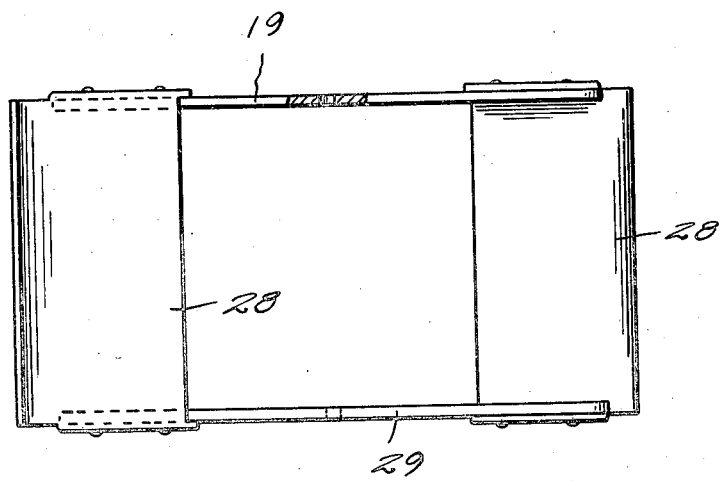
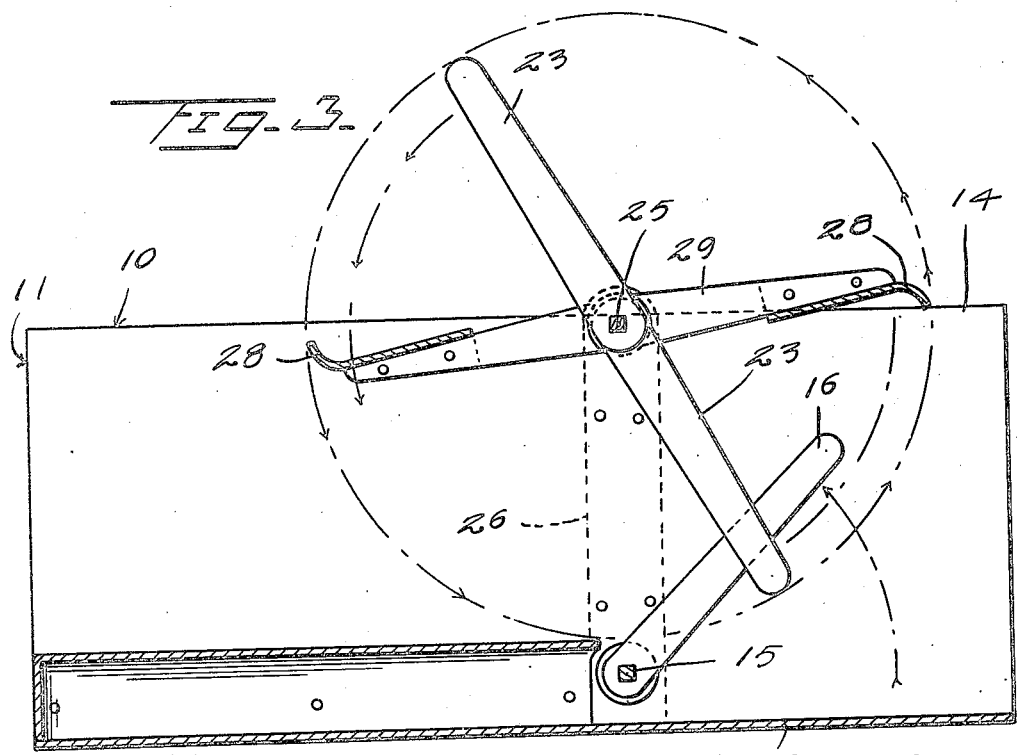
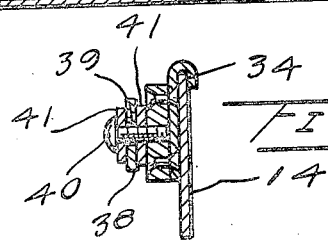
Inventors
F. Allen Barnes
P. H. Numsen
By Kimmel & Crowell
Attorneys Patented Feb. 21, 1950

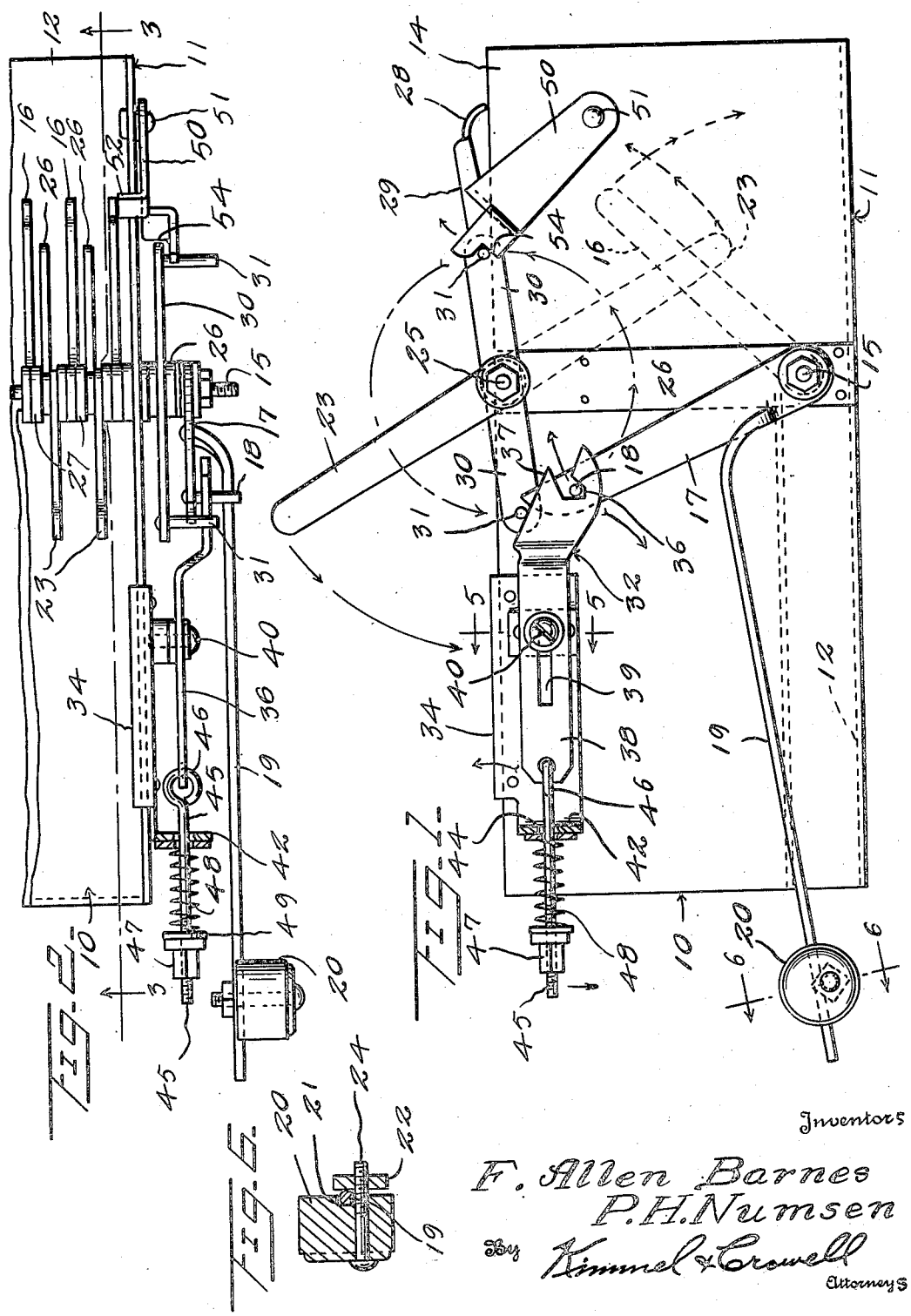

2,498,341

UNITED STATES PATENT OFFICE 2,498,341

FISH GATE

Phalen H. Numsen and Frank A. Barnes, Missoula, Mont.

Application February 10, 1947, Serial No. 727,620

8 Claims. (Cl. 61—21)

This invention relates to a fish gate, and more particularly to a device of this kind for excluding fish from certain streams, while permitting debris of various kinds to pass through the gate.

It is an object of this invention to provide a fish gate of the kind to be more specifically described, hereinafter, having interengaging fins which are rockably supported in a body, being locked in one position for partially blocking the passage through the body and which are actuated by the weight of debris and other material piling up behind the fins for permitting the debris to pass through the gate while excluding fish or other active marine life.

Another object of this invention is to provide a fish gate of this kind having lower pivoted blades and upper rotating blades which are held in position by a spring-pressed trigger. Debris or other material piling up behind the blades will, when a certain weight is reached, release the trigger which in turn permits the upper blades to be rotated and the lower blades to be pivoted for permitting the debris to pass through the gate.

Still another object of this invention is to provide a gate of this kind having a spring-pressed trigger, the tension of which may be selectively adjusted to release the blades when a predetermined weight of debris is exerted against the blade.

A further object of this invention is to provide a gate of this kind having rotatable blades which are releasably held against rotation in one direction by a spring-pressed trigger having paddles for rotating the blades by the force of the water passing through the body when the trigger is released, and having means for holding the blades against rotation in a reversed direction by the action of the wind acting on the paddles in the latched position of the blades.

With the above and other objects in view, our invention consists in the arrangement, combination and details of construction disclosed in the drawings and specification, and then more particularly pointed out in the appended claims.

In the drawings,

Figure 1 is a side elevation, partly in section, of a fish gate constructed according to an embodiment of this invention, Figure 2 is a fragmentary top plan view, partly in section, of the right side of the gate, Figure 3 is a vertical section taken on the line 3—3 of Figure 2, Figure 4 is a top plan view, partly in section, of the paddles removed from the gate, Figure 5 is a detail vertical section taken on the line 5—5 of Figure 1, Figure 6 is a detail section taken on the line 6—6 of Figure 1.

Referring to the drawings, the numeral 10 designates generally a fish gate for use in small streams or other openings in a body of water, in which fish have been stocked, for permitting the passage of water and debris through the gates while preventing the fish from leaving the lake through the gate.

The gate 10 is formed of a U-shaped channel body 11 having the bight 12 resting on the bottom of the stream and the arms 14 extending vertically upward from each side thereof. A lower shaft 15 is fixed between the arms 14 transversely of the body 11, adjacent the bottom 12. Blades 16, spaced apart transversely, are fixed at their lower end to the shaft 15.

The blades 16 in normal position are disposed so that they extend rearwardly and upwardly relative to the body 11, and the shaft 15 is pivotally mounted so that the blades 16 may be pivoted to a horizontal rearwardly extending position. A lever 17 is fixed on the shaft 15 outwardly of one wall 14 and extends in its normal position forwardly and upwardly relative to the blades 16. An outwardly extending pin 18 is fixed on the upper end of the lever 17 for holding the hook to be described hereinafter in a normal position. A forwardly extending rod 19 is fixed to the lever 17 at one end thereof and extends forwardly of the lever 17 and the body 11. A weight 20 is fixed on the forward end of the rod 19 for normally urging the lever 17 and the blades 16 to their normal position.

The weight 20 is adjustably secured on the rod 19, being formed with a slot 21 on one side thereof through which the rod 19 engages, and a nut 22 on the bolt 24 clamps the rod 19 to the weight 20. An upper shaft 25 is rotatably mounted between the side walls 14 at the upper edge thereof, directly above the shaft 15. Supporting plates 26 are fixed to the walls 14 for strengthening the walls at the point of suspension of the shafts 15 and 25.

Blades 23 are fixed on the shaft 25 in transverse spaced apart relation and are adapted to be engaged between the blades 16 on the lower shaft 15. The blades 23 are fixed on the shaft 25 on opposite sides thereof and are spaced apart by washers 27. For securing the blades 23 to the shaft, the shaft may be made rectangular in cross section and the blades formed with a rectangular opening at the inner end therefor for engagement about the shaft 25. The blades 23 are fixed relative to the shaft 25, while the shaft 25 is rotatable relative to the body or housing 11. In their normal position the blades 23 are disposed in an upwardly and forwardly extending position, the lowermost blades engaging between the lower blades 16, as shown in Figures 1 and 3.

Paddles 28 are fixed on the shaft 25 on opposite sides thereof by supporting arms 29 which are fixed on the shaft 25 in the same manner as the blades 23. The paddles 28, in their normal position, as shown in Figure 3, are disposed in a slightly downward and forwardly extending position, somewhat less than 90° away from the center line of the blades 23. In their normal position the paddles 28 are supported above the level of the water passing through the gate, and at the time the blades 23 are initially started in their rotation, the forward paddle engages in the water and the force of the water passing through the gate carries this paddle 28 a radial distance of 90°.

A lever 30 is fixed on the shaft 25 outwardly of the wall 14 above the lever 17. The lever 30 extends on opposite sides of the shaft 25 in substantially the same line as the line of the paddle 28. Pins 31 are fixed on the ends of the levers 30 for engaging with the trigger and lock mechanisms.

For holding the blades 16 and 23 in their normal position to permit the free flow of water through the gate, while excluding fish from passage therethrough, a hook 32 is provided with which the levers 17 and 30 are engaged, the hook 32 providing a trigger for releasing the blades 16 and 23 when the weight of debris against the blades 16 is greater than the force exerted by the weight 20. The hook 32 is pivotally and slidably mounted on one side wall 14 of the gate 11 by a bracket 34 fixed to the wall 14 forwardly of the levers 17 and 30. The hook 32 is formed at its forward end with a rearwardly divergent opening 35 in a downwardly extending notch 36 at the forward end thereof, in which the pin 18 of the lever 17 is adapted to be engaged. The upper edge 37 of the hook 32 is inclined downwardly and rearwardly and the pin 31 of the lever 30 is adapted to engage in the normal position. The hook 32 is provided with a forwardly extending shank 38 which is formed with an elongated longitudinally extending slot 39.

A pin 40 fixed to the bracket 34 on the wall 14 loosely engages in the slot 39. Washers as 41 space the shank 38 from the bracket 34 and from the head of the bolt 40 so that the hook 32 may be pivoted about the bolt 40 and may slide relative thereto upon suitable force applied from the lever 17.

The bracket 34 is formed at its forward end with an outwardly extending flange 42 having an opening 44 therein through which a rod 45 may slidably engage. The rearward end of the rod 45 is formed in a hook 46 for engaging the front end of the shank 38. A nut 47 is threadably supported on the rear end of the shaft 45 for adjustably holding the spring 48 about the rod 45 between the nut 47 and the forward side of the flange 42. Washers as 49 may be placed at each end of the spring 48 to provide a bearing at each end thereof. The spring 48 then provides the tension for the hook 32.

In the operation of this fish gate, when the debris piling up behind the blades 16 overcomes the force of the weight 20, the blades 16 are moved pivotally downwardly and forwardly. This movement raises the pin 18 of the lever 17 forwardly out of the groove 36 and mouth of the hook 35, and the debris acting on the lower blades 23 pushes the pin 31 on lever 30 downwardly, causing the hook 32 to be pivoted about the pin 40 until the pin 31 has moved downwardly past the hook 31 at each time the spring 48 returns the hook to its normal horizontal position.

The lower blades 16 at this time have only been partially moved in their pivoted position, and the pin 31 being of sufficient length to engage the forward side of the lever 17 further moves the lever 17 and lower blades 16 as the paddles 28 engage in the water. The water moves the paddles 28 substantially 180° from their normal position, thus causing the pin 31 to move the lever 17 to the extreme forward position so that the blades 16 are substantially horizontal in their extreme position. The force of the water through the gates will effect this movement of the upper blades 23 and when the pin 31 has moved the lever 17 to its extreme position, the weight 20 will cause the lever 17 to return immediately to its initial normal position engaging in the hook 32. The hook 32 will also stop the rotation of the upper blades 23 after a complete cycle has been accomplished.

For holding the blades 23 against rotation in a reversed direction, a pawl 50 is pivotally mounted on the wall 14 by a pin 51. The pawl 50 extends forwardly and upwardly from the pivot point 51 and an inwardly extending flange 52 engages the upper edge of the wall 14 to hold the pawl from falling downwardly. A square corner 54 is cut in the lower forward end of the pawl 50, the lower edge of this corner extending downwardly and forwardly, in which the pin may engage.

Any wind force on the paddle 28 merely lodges the pin 31 into the pawl 50 at the corner 54 while the pin 31 in its normal rotation may move upwardly free of the pawl.

The fish gate 10 is particularly adapted to be used where water is taken from a stream and passed into an irrigation canal to prevent the fish from leaving the stream and going into the irrigation ditch. For excluding small fish, the blades may be disposed in close relation as about a quarter of an inch apart. Most types of fish are timid of fast moving foreign objects near them and it has been noted that when the gate 10 is in operating movement, the fish momentarily back away from the device until the movement has stopped, and at this time the interengaging blades prevent the fish from going through the gate. Since the gates are used for narrow passages, all of the water passing from the stream to the ditch is caused to go through the gate and no other means of passage of the fish is provided.

We do not mean to confine ourselves to the exact details of construction herein disclosed, but claim all variations falling within the purview of the appended claims.

What we claim is:

1. A fish gate of the kind described comprising a U-shaped channel body, a pair of vertically spaced apart shafts rotatably mounted transversely of said body, transversely spaced apart blades fixed on the lowermost of said shafts extending rearwardly thereof, transversely spaced apart blades fixed on the uppermost of said shafts on opposite sides thereof, said upper blades engageable between said lower blade upon rotation of said uppermost shaft, a lever fixed on said lower shaft, a weight fixed on said lever spaced forwardly therefrom for urging said blades to normal raised position, said lever extending forwardly and upwardly from said shaft in its normal position, said lower blades extending rearwardly and upwardly in the normal position, a pin on the upper end of said lever, a spring-pressed hook member pivotally and slidably mounted on said body, said pin engageable in said hook member for limiting the forward movement of said lever, a lever arm on said upper shaft on opposite sides thereof radially offset from said upper blades pins on the opposite ends of said lever arm, one of said pins engageable with said hook member for holding said upper blades against rotation in one direction, a pawl rearwardly of said upper shaft engageable with the other of said pins for holding said upper blades against rotation in the opposite direction, said latter pins engageable with said first lever whereby said lever arm will pivot said first lever forwardly upon releasing said levers from said hook member upon initial forward pivotal movement of said lower blades.

2. A fish gate of the kind described comprising a channel body, a pair of vertically spaced apart transverse shafts rotatably carried by said body, forwardly and upwardly inclined blades fixed on the upper of said shafts on opposite sides thereof, rearwardly and upwardly inclined blades on the lower of said shafts, a hook member slidably and pivotally mounted on said body, a lower lever fixed on said lower shaft engageable with said hook, levers on said upper shaft engageable with said hook and said lower lever, means constantly urging said lower lever in engagement with said hook, and paddles on said upper shaft for rotating said shafts and said blades after initial movement of said lower lever from said hook.

3. A debris actuated fish gate comprising a channeled body open at the ends thereof, upper blades rotatable in said body, lower blades pivoted in said body and engageable between said upper blades, and spring pressed locking means releasable by a predetermined amount of debris engaging said blades for holding said blades against movement, said means permitting one-half revolution of said upper blades upon releasing said upper and lower blades.

4. A debris actuated fish gate comprising a body, upper blades rotatable in said body, lower blades pivotally mounted in said body, said lower blades extending rearwardly and upwardly between said upper blades and adapted to be pivoted by debris accumulating thereon, a spring-pressed hook on said body and means holding said blades in operative position, said means being releasable upon initial pivoting of said lower blades, and means rotating said upper blades 180° after release from said hook.

5. A debris actuated fish gate comprising a channeled body, upper blades rotatably mounted in said body, paddles for rotating said upper blades, lower blades pivotally mounted in said body, said lower blades engaging between said upper blades and adapted to be pivoted by a certain amount of debris, a tensioned hook member pivotally mounted on said body, a lower lever pivotal with said lower blades, said lever engaging said hook member for holding said hook against pivotal movement in the normal erect position of said lower blades, oppositely disposed levers rotatable with said upper vanes engaging said hook member for holding said upper vanes against rotation in the normal position, said latter levers engageable with said lower lever for pivoting said lower lever and said lower blades after initial pivotal movement of said lower blades permits pivoting of said hook member and rotation of said upper vanes.

6. A debris actuated fish gate comprising a channeled body, lower blades pivotally mounted in said body, upper blades rotatably mounted in said body, said upper blades disposed between said lower blades in the normal position thereof, a lower lever pivotal with said lower blades, and upper lever rotatable with said upper blades, releasable tensioned means engaging said upper lever for holding said upper blades against rotation, said lower lever engaging said means in the normal position thereof, said upper lever engaging said lower lever upon rotation thereof after initial release of said means by initial pivotal movement of said lower lever for further pivoting said lower lever, and means for rotating said upper blades.

7. A debris actuated fish gate as set forth in claim 6 wherein said means comprises a spring-pressed hook member pivotally mounted on said body.

8. A debris actuated fish gate as set forth in claim 6, wherein said means comprises a spring-pressed hook member slidably and pivotally mounted on said body.

PHALEN H. NUMSEN.
FRANK A. BARNES.

No references cited.